April 1, 1969  A. H. LINDQUIST  3,436,055
MOUNTING DEVICE FOR WICKET GATES OF A TURBINE
Filed March 16, 1966  Sheet 1 of 2

INVENTOR
Arne Herman Lindquist

BY Hame and Nydick
ATTORNEY

United States Patent Office
3,436,055
Patented Apr. 1, 1969

3,436,055
MOUNTING DEVICE FOR WICKET GATES
OF A TURBINE
Arne Herman Lindquist, Trollhattan, Sweden, assignor to
Nydqvist & Holm Aktiebolag, Trollhattan, Sweden, a
corporation of Sweden
Filed Mar. 16, 1966, Ser. No. 534,854
Claims priority, application Sweden, Mar. 18, 1965,
3,541/65
Int. Cl. F16k 1/16, 13/00
U.S. Cl. 251—305          5 Claims

ABSTRACT OF THE DISCLOSURE

A mounting device in which the wicket gate of a turbine is pivotally and axially displaceably mounted between a head cover and a bottom ring. An adjustment means on the head cover permits adjustment of the spatial position of the head cover so that the total width of gaps between the end faces of the wicket and the head cover and the bottom ring respectively is at a minimum and selectively divided between the upper and the lower gap thereby reducing water seepage past the wicket when the same is closed upon shutdown of the turbine.

---

Figure 1:
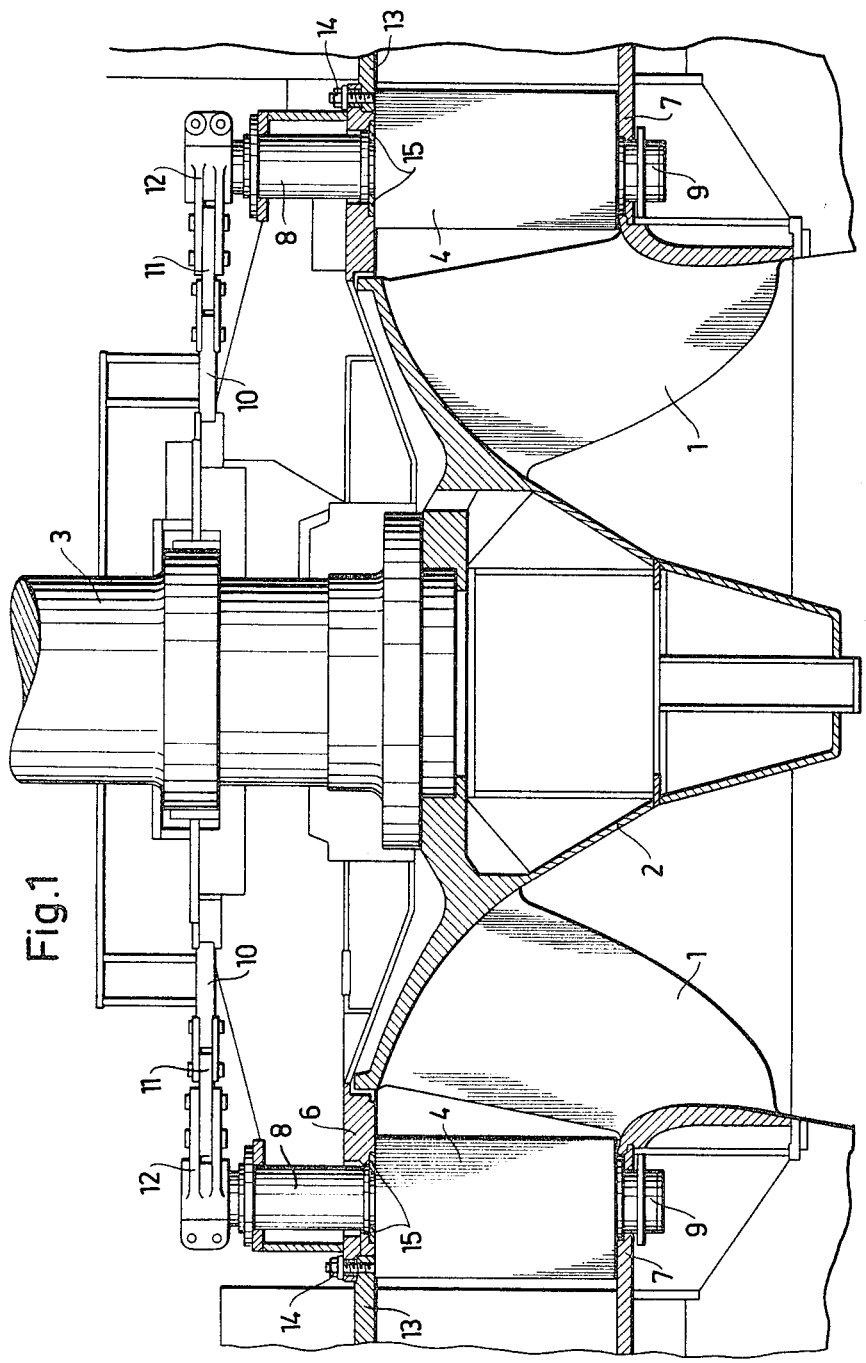

The present invention relates to wicket gates for water turbines.

Wicket gates are used to control the volume of water fed to a water turbine and thus the load on such turbine. The gates are operated by a gate-operating ring, which in turn is usually operated by means of links and levers or also by means of a servomotor, one operating mechanism being provided for each wicket gate. A turbine is generally equipmented with twenty to twenty-four wicket gates.

Shutdown of a water turbine is effected by turning the wicket gates into the closing position. After a turbine is shut down, so-called seepage water passes through a gap between the head cover of the turbine and the upper end faces of the wicket gates and a gap between the bottom ring and the lower end faces of the gates. Some flow of such seepage water is unavoidable, but it is desireable that the volume of water seepage through a turbine after the same is shut down be as low as possible, because it is difficult to bring the turbine to a full stop if the volume of water seepage is large.

Several structures are known for the purpose of reducing the volume of water seepage when the wicket gates are closed, but all such structures as heretofore known are complicated and expensive. One of the most usual of the known arrangements obtains the desired small gaps by providing extremely narrow tolerances at the stay rings, head covers and wicket gates. Such an arrangement has the disadvantage that the costs of the turbines are considerably increased due to the narrow tolerances to be maintained.

It is a broad object of the invention to provide a novel and improved mounting device for mounting the wicket gates of a water turbine, which device reduces the flow of seepage to a minimum without requiring the use of narrow and hence costly tolerances for the components involved.

Other and further objects, features and advantages of invention will be pointed out hereinafter and set forth in the appended claims constituting part of the application.

In the accompanying drawing, a preferred embodiment of the invention is shown by way of illustration and not by way of limitation.

Figure 2:
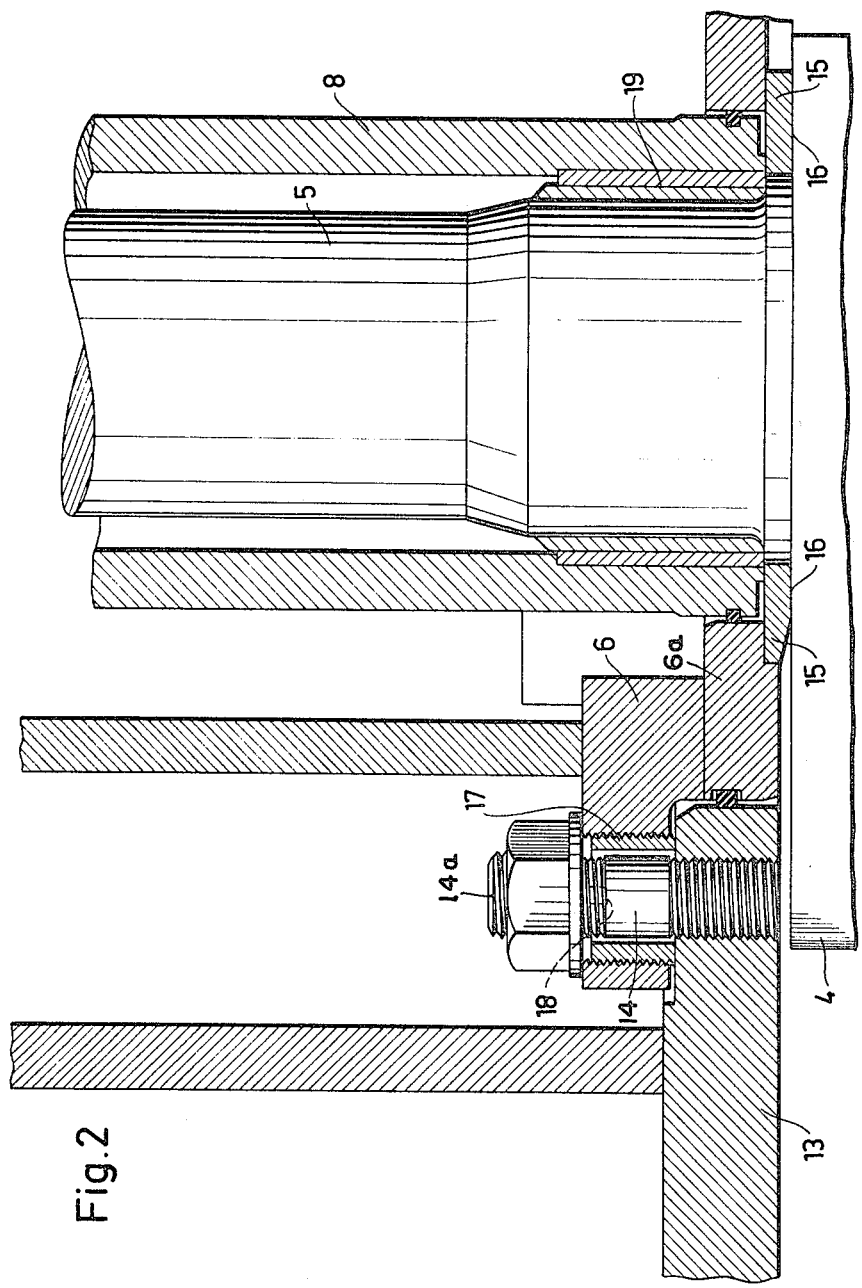

In the drawing:

FIG. 1 is an elevational fragmentary view, partly in section, of a water turbine equipped with a mounting device according to the invention; and FIG. 2 is an elevational cross section of the mounting device on an enlarged scale.

Referring now to the figures in detail, the water turbine illustrated in part for exemplifying the mounting device is a Francis turbine. It comprises buckets 1, a runner cone 2 and a main shaft 3. Each of a plurality of wicket gates 4 has at both ends an axially protruding stem 5, only the top stem being shown. This stem is journaled in a bearing box 8 supported by a head cover 6 of the turbine. Bearing box 8 includes axially slidable bearing sleeves 19 to permit a limited axial displacement of the wicket gate in reference to box 8 and thus in reference to head cover 6, for a purpose which will be more fully explained hereinafter. The lower gate stems of each wicket are simliarly journaled in a bottom ring 7 by means of bearing boxes 9. These boxes may or may not include axially slidable bearing sleeves. The wicket gates are pivotal about the stems thereof as rotational axes. Turning of the gates is effected by an upper gate-operating ring 10, which in turn is controlled by links 11 and levers 12 in a conventional manner.

Head cover 6 is secured to a stay ring 13 by screw bolts 14 screwed into the stay ring and nuts 14a screwed upon the bolts and securing the head cover. Stay ring 13 should be visualized as being stationarily mounted in reference to the head cover.

As can be clearly seen in FIG. 2, a gap 16 is defined between the upper end faces of the wicket gates and a facing plate 15 which in turn abuts against a portion 6a of the head cover. The facing plate is tapered at its rim portion engaging head cover portion 6a. A similar gap is defined between the lower ends of the wicket gates and bottom ring 7.

As is explained in the introduction of the specification, there is a danger that water will seep past the end faces of the wickets in the closed position thereof. FIGS. 1 and 2 show the wicket gate in the oepn position. As is apparent from the figures, in this position the lateral edges of the wicket gate are located well outside of the radial width of the facing plates 1. However, when the wicket is closed by turning the same about its stems 5 the lateral edges of the wicket gate are located well within the radial location of the point of the facing plate at which the tapered edge of the facing plate starts. Accordingly, the provision of such tapered edge does not leave a non-controllable gap portion when the gaps are adjusted as hereinafter described.

As pointed out before, the sum total of the widths of these gaps at the upper and lower ends of the wicket gates should be as small as possible. To accomplish this purpose, an adjustable support means for supporting head cover 6 by stay ring 13 is provided. This support means comprises an externally threaded sleeve 17 encompassing bolt 14 with play and engaging a threaded bore in head cover 6. The sleeve abuts with its lower end against the upper side of spatially stationary stay ring 13. As is evident, the position of sleeve 17 within the threaded bore of head cover 6 controls the position of head cover 6 and its portion 6a and thus of wicket gate 4 in reference to the stay ring. Accordingly, the total width of the aforedefined gaps can be adjusted by turning sleeve 17 in the head cover so that the head cover and its portion 6a are lowered into a position in which the lower end face of the wicket rests upon bottom ring 7. Accordingly, the lower gap disappears and the width of upper gap 16 constitutes the total width of the spacing then present adjacent to the wicket gate. In order to divide the total width of the spacing between the upper and the lower end faces of the wicket gate into an upper gap and a lower gap, the wicket gate is raised by again turning sleeve 17, though in opposite direction, until the desired division between the upper gap and the lower gap is obtained, bearing box 8 permitting a limited axial displacement of the wicket stems as previously described. To facilitate turning of sleeve 17, a screwdriver slot 18 may be provided.

When a turbine is in operation, the head cover thereof may be subject to a powerful torque. To sustain such torque, the head cover is preferably secured to the upper stay ring by means of conical pins (not shown) in a conventional manner.

What is claimed is:

1. A mounting device for mounting a wicket gate of a water turbine, said mounting device comprising a head cover, a bottom ring, a wicket gate having an upper end lower axially protruding stem, said stems being journaled in said head cover and said bottom ring, respectively, for pivoting said gate about a rotational axis defined by said stems, said cover and ring and the adjacent end faces of the wicket gate defining gaps therebetween, an axially slidable bearing seating the upper stem of the gate in said head cover to permit a change in the width of said gaps by axially displacing the gate in reference to the head cover and the bottom ring, a stationarily mounted stay ring, and an axially adjustable support means on the stay ring and the head cover supporting the latter displaceably in the direction of said rotational axis, whereby the total width of the gaps between the end faces of the wicket gate and the head cover and the stay ring, respectively, is selectively divisible by adjusting said support means.

2. A mounting device according to claim 1, wherein said support means comprise an adjustable member abutting against said stay ring and engaging said head cover to support the latter in a selected position in reference to the stay ring, and setting means for varying the position of said adjustable member in reference to the head cover, thereby correspondingly varying the distance between the head cover and the bottom ring and thus the total width of the gaps.

3. A mounting device according to claim 2, wherein said adjustable member is an externally threaded sleeve threaded into a threaded bore of the head cover and resting with one end on said stay ring, whereby rotation of said sleeve varies the position of the head cover in reference to the stay ring.

4. A mounting device according to claim 3, wherein said support means further comprise mounting means secured to said stay ring and abutting against said head cover.

5. A mounting device according to claim 4, wherein said mounting means comprise a screw bolt secured to the stay ring and extending with play through said sleeve, protruding therefrom, and a nut threaded upon the bolt and abutting against the head cover to permit movement of the latter in reference to the stay ring upon displacement of the sleeve in reference to the head cover.

References Cited
UNITED STATES PATENTS

| | | | |
|---|---|---|---|
| 832,431 | 10/1906 | Stewart | 277—108 |
| 907,597 | 12/1908 | Henneböhle | 277—108 X |
| 1,546,594 | 7/1925 | McAulay | 251—307 |
| 3,096,070 | 7/1963 | Wolfensperger | 251—214 |
| 3,096,071 | 7/1963 | Fisher | 251—308 X |
| 3,175,573 | 3/1965 | Vater | 251—214 X |
| 3,235,272 | 2/1966 | Smith | 251—214 X |
| 3,262,709 | 7/1966 | Hansen et al. | 251—214 X |

M. CARY NELSON, *Primary Examiner.*

R. C. MILLER, *Assistant Examiner.*